US012000806B2

(12) United States Patent
Cormier et al.

(10) Patent No.: US 12,000,806 B2
(45) Date of Patent: Jun. 4, 2024

(54) INTERFACE MODULE FOR TWO-DIMENSIONAL LIQUID CHROMATOGRAPHY

(71) Applicant: Waters Technologies Corporation, Milford, MA (US)

(72) Inventors: Sylvain Gilles Cormier, Mendon, MA (US); Charles H. Phoebe, Jr., Venetia, PA (US)

(73) Assignee: Waters Technologies Corporation, Milford, MA (US)

( * ) Notice: Subject to any disclaimer, the term of this patent is extended or adjusted under 35 U.S.C. 154(b) by 238 days.

(21) Appl. No.: 17/733,218

(22) Filed: Apr. 29, 2022

(65) Prior Publication Data

US 2022/0260532 A1     Aug. 18, 2022

Related U.S. Application Data

(62) Division of application No. 16/556,532, filed on Aug. 30, 2019, now Pat. No. 11,360,056.

(Continued)

(51) Int. Cl.
*G01N 30/20* (2006.01)
*B01D 15/08* (2006.01)
(Continued)

(52) U.S. Cl.
CPC .............. *G01N 30/20* (2013.01); *B01D 15/08* (2013.01); *G01N 30/463* (2013.01); *G01N 2030/027* (2013.01); *G01N 30/34* (2013.01)

(58) Field of Classification Search
CPC ...... G01N 30/20; G01N 30/34; G01N 30/463; G01N 2030/027; B01D 15/08
See application file for complete search history.

(56) References Cited

U.S. PATENT DOCUMENTS 7,507,337 B2    3/2009  Petro et al.
7,797,989 B2    9/2010  Swart et al.
(Continued)

FOREIGN PATENT DOCUMENTS

EP    2257355 A    12/2010
EP    3617701 A1   3/2020
(Continued)

OTHER PUBLICATIONS

Examination Report in European Patent Application No. 19769301.3 dated Jun. 30, 2023.
(Continued)

*Primary Examiner* — John Fitzgerald
(74) *Attorney, Agent, or Firm* — Schmeiser, Olsen & Watts LLP; William G. Guerin

(57) ABSTRACT

Described are an interface module for two-dimensional chromatography and a method of performing a chromatographic separation that may use the interface module. The interface module includes a valve module, a collection needle, a modifier module and a sample storage element. The valve module has a first port configured to receive an eluent from a first chromatography system, a second port configured to provide a fraction obtained from the eluent, a third port and a fourth port. The collection needle and the modifier module are in fluidic communication with the valve module at the third and fourth ports, respectively. The modifier module includes a source of a modifier solvent. The sample storage element is in fluidic communication with the valve module and is configured to receive a volume of the fraction for injection as a sample into a second chromatography system.

7 Claims, 8 Drawing Sheets

Related U.S. Application Data

(60) Provisional application No. 62/727,166, filed on Sep. 5, 2018.

(51) Int. Cl.
  *G01N 30/46* (2006.01)
  *G01N 30/02* (2006.01)
  *G01N 30/34* (2006.01)

(56) References Cited

U.S. PATENT DOCUMENTS

| | | |
|---|---|---|
| 9,470,664 B2 | 10/2016 | Dourdeville et al. |
| 10,802,001 B2 | 10/2020 | Burnett et al. |
| 11,112,390 B2 | 9/2021 | Cormier |
| 11,340,199 B2 * | 5/2022 | Venkatramani ........ G01N 30/88 |
| 2006/0054543 A1 | 3/2006 | Petro et al. |
| 2008/0229810 A1 | 9/2008 | Swart et al. |
| 2012/0305464 A1 | 12/2012 | Cormier |
| 2014/0014585 A1 | 1/2014 | Dourdeville et al. |
| 2016/0069844 A1 * | 3/2016 | Jackson ................ G01N 30/06 |
| | | 73/61.55 |
| 2018/0052141 A1 * | 2/2018 | Stoll ...................... G01N 30/34 |
| 2018/0364203 A1 | 12/2018 | Burnett et al. |
| 2019/0017974 A1 * | 1/2019 | Lee ........................ B01D 15/08 |
| 2020/0064314 A1 | 2/2020 | Sievers-Engler |
| 2020/0072800 A1 | 3/2020 | Cormier et al. |

FOREIGN PATENT DOCUMENTS

| | | |
|---|---|---|
| WO | 2007062642 A1 | 6/2007 |
| WO | 2011106162 A1 | 9/2011 |

OTHER PUBLICATIONS

Non-Final Office Action in U.S. Appl. No. 16/556,532, dated Jan. 3, 2022; 7 pages.
Notice of Allowance in U.S. Appl. No. 16/556,532, dated Mar. 1, 2022; 9 pages.
Restriction Requirement in U.S. Appl. No. 16/556,532, dated Oct. 18, 2021; 5 pages.
Guiochon, et al. "Implementations of two-dimensional liquid chromtography," Feb. 16, 2008, Journal of Chromatography A, 1189, pp. 109-168.
Pan, et al. "Review of online coupling of sample preparation techniques with liquid chromatography," Jan. 15, 2014, Analytuca Chimica Acta, 815, pp. 1-15.
International Search Report and Written Opinion in PCT/US2019/048975 dated Dec. 18, 2019; 16 pages.
"Agilent 1290 Infinity 2D-LC Solution for Multiple Heart-Cutting: Technical Overview," Agilent Technologies, Jun. 1, 2015.
"Agilent 1290 Infinity 2D-LC-Solution: User Guide," Agilent Technologies, Jan. 2015.
International Preliminary Report on Patentability in PCT/US2019/048975 dated Mar. 18, 2021; 9 pages.

* cited by examiner

INTERFACE MODULE FOR TWO-DIMENSIONAL LIQUID CHROMATOGRAPHY

CROSS REFERENCE TO RELATED APPLICATIONS

This application is a divisional of U.S. patent application Ser. No. 16/556,532, filed Aug. 30, 2019, titled "INTERFACE MODULE FOR TWO-DIMENSIONAL LIQUID CHROMATOGRAPHY" which claims the benefit of and priority to U.S. Provisional Patent Application No. 62/727,166, filed Sep. 5, 2018, titled "INTERFACE MODULE FOR TWO-DIMENSIONAL LIQUID CHROMATOGRAPHY", the entireties of each of which are incorporated by reference herein.

FIELD OF THE INVENTION

The technology generally relates generally to two-dimensional liquid chromatography. More particularly, the technology relates to an interface module that receives an eluent from a first chromatography system and provides a modified fraction from the first chromatography system to a second chromatography system.

BACKGROUND

Conventional two-dimensional chromatography systems typically utilize multiple valves, T couplings, sample loops and a pump to collect fractions from the eluent of a first chromatography system and inject the fractions into the second chromatography system. The valves and sample loops limit the control of the sample matrices and can contribute to sample instability or decomposition prior to injection into the second chromatography system. In addition, fractions collected from the first chromatography system may not be compatible with the second chromatography system. The sample loops do not allow access to the stored fractions thereby preventing any necessary modification to the fractions to permit analysis by the second system.

Other problems exist with the use of many two-dimensional chromatography systems. One problem is due to the significant pressure pulses that can occur upon injection into the second chromatography system. These pressure pulses can result in a reduction in the useful lifetime of the second-dimension column and a negative impact on the accuracy of the chromatographic analysis. Another limitation is the variability in the volume capacities of the sample loops used to store the collected fractions prior to injection into the second chromatography system. The volume capacities can vary significantly due, in part, to poor control of the inner diameters of the tubing used for the sample loops. Consequently, the chromatographic data obtained from the second system for a fraction stored in one sample loop may be significantly for an identical fraction stored in a different sample loop.

Other disadvantages include a limited number of sample loops which restricts the number of fractions that can be collected from the first chromatography system. Conventional systems may have just two sample loops, for example, to perform comprehensive two-dimensional liquid chromatography, while other known systems include as many as six sample loops. In some instances, it is desirable to have a capability to store substantially more fractions from the first chromatography system; however, physical size limitations prevent a large number of fittings to be coupled to a valve and require more time to assemble the systems.

SUMMARY

In one aspect, an interface module for two-dimensional chromatography includes a valve module, a collection needle, a modifier module and a sample storage element. The valve module has a first port configured to receive an eluent from a first chromatography system, a second port configured to provide a fraction obtained from the eluent, a third port and a fourth port. The collection needle is in fluidic communication with the valve module at the third port and the modifier module is in fluidic communication with the valve module at the fourth port. The modifier module includes a source of a modifier solvent. The sample storage element is in fluidic communication with the valve module and is configured to receive a volume of the fraction for injection as a sample into a second chromatography system.

The interface module may further include a plurality of collection vials in which a position of the collection needle is controllable so as to be in fluidic communication with one of the collection vials. The interface module may further include an automated positioner, wherein the collection needle is secured to the automated positioner and wherein the automated positioner is configured to position the collection needle with respect to the collection vials.

The interface module may further include a metering syringe in fluidic communication with the valve module. The interface module may further include a syringe valve and a solvent reservoir, wherein the solvent reservoir is in fluidic communication with the metering syringe when the syringe valve is in a first valve state and wherein the valve module is in fluidic communication with the metering syringe when the syringe valve is in a second valve state.

The interface module may further include a plurality of metering syringes, syringe valves and solvent reservoirs, with each of the metering syringes being in fluidic communication with the valve module and a respective one of the solvent reservoirs through a respective one of the syringe valves.

The valve module may include at least two valves in fluidic communication with each other with each valve being configurable to be in one of at least two valve states. At least one of the valves may be a rotary valve.

The valve module may include a first valve configurable in a first valve state in which the eluent from the first chromatography system flows through the first valve to a waste outlet and configurable in a second valve state in which the eluent from the first chromatography system flow through the first valve and into the collection needle. The valve module may further include a second valve in fluidic communication with the first valve, wherein the second valve is configurable in a third valve state in which a system flow of the second chromatography system flows through a sample storage element fluidically coupled to the second valve and which enables the modifier solvent to flow through the second valve toward the first valve. The second valve being further configurable in a fourth valve state in which the mobile phase flows through the second valve and bypasses the sample storage element.

The sample storage element may be a sample loop.

The interface module may further include an interface module controller in communication with the modifier module and the valve module. The interface module controller is configured to change a valve state of the valve module and to control a position of the collection needle relative to the collection vials.

In another aspect, a method of performing a chromatographic separation includes providing an eluent of a first chromatography system through a valve module configurable in a plurality of valve states, wherein the valve module is configured in a first valve state so that the eluent is directed by the valve module into a collection path defined between the valve module and a collection vial to thereby dispense a fraction in the eluent into the collection vial. The method further includes configuring the valve module in a second valve state to direct a volume of a first solvent into the collection path so that a remainder of the fraction in the collection path is dispensed into the collection vial, dispensing a second solvent through the collection path and into the collection vial to generate a modified sample, and drawing at least a portion of the modified sample from the collection vial into a sample storage element. The method further includes configuring the valve module in a third valve state to direct a system flow of the second chromatography system through the sample storage element to thereby inject the modified sample into the second chromatography system.

The second solvent may be one of a buffer solvent, a solvent having a pH that is different from a pH of the first sample, and a diluent. The first solvent and the second solvent may be the same solvent.

The sample storage element may be a sample loop.

Dispensing the second solvent may further include changing the valve state of the valve module. Drawing a least a portion of the modified sample may further include changing the valve state of the valve module.

The method may further include configuring the valve module to the first state after an injection of the modified sample into the second chromatography system and repositioning the collection path to redirect the eluent of the first chromatography system through the collection path to dispense a different fraction in the eluent into a second collection vial.

BRIEF DESCRIPTION OF THE DRAWINGS

The above and further advantages of this invention may be better understood by referring to the following description in conjunction with the accompanying drawings, in which like reference numerals indicate like elements and features in the various figures. For clarity, not every element may be labeled in every figure. The drawings are not necessarily to scale, emphasis instead being placed upon illustrating the principles of the invention.

DETAILED DESCRIPTION

Figure 1:
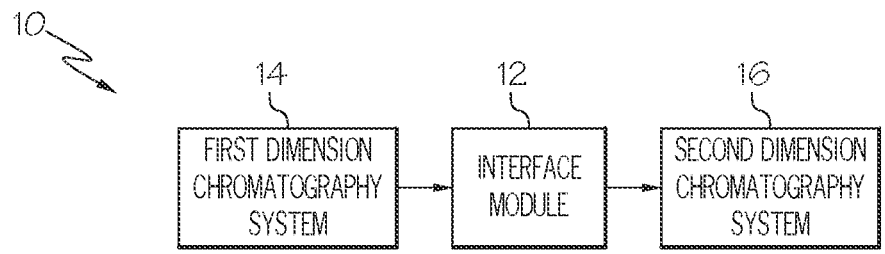
FIG. 1 is a diagram of a two-dimensional chromatography system having an interface module in communication with a first-dimension chromatography system and a second-dimension chromatography system.

Reference in the specification to "one example" or "an example" means that a particular feature, structure or characteristic described in connection with the example is included in at least one example of the teaching. References to a particular example within the specification do not necessarily all refer to the same example.

In brief overview, examples disclosed herein are directed to an interface module for interfacing two chromatography systems. For example, the interface module may be used in a two-dimensional chromatography system to collect fractions from an eluent of a first-dimension chromatography system and inject samples (i.e., the collected fractions) into a second-dimension chromatography system. After collection and prior to injection in the second-dimension system, one or more of the fractions may be modified through the addition of one or more solvents to generate a modified sample for the second-dimension system. In some implementations the interface module may also be used to acquire and inject samples into one of the two systems (e.g., the first-dimension system), to collect fractions from the other one of the two systems (e.g., the second-dimension system), or both acquire and inject samples in one of the systems and collect fractions from the other system. Advantageously, the need for an operator to assist in the transfer of the collected fractions and modification of the collected fractions is reduced or eliminated. Modifications may be made to chemically stabilize the collected fractions and/or to make the collected fractions more compatible with the chromatographic separation to be performed by the second system and/or spectroscopic analysis.

The present teaching will now be described in more detail with reference to examples shown in the accompanying drawings. While the present teaching is described in conjunction with various examples, it is not intended that the present teaching be limited to such examples. On the contrary, the present teaching encompasses various alternatives, modifications and equivalents, as will be appreciated by those of skill in the art. Those of ordinary skill having access to the teaching herein will recognize additional implementations, modifications and examples, as well as other fields of use, which are within the scope of the present disclosure.

The examples described below include an interface module for two-dimensional chromatography although it will be recognized that other implementations of the interface module are not limited to systems used for two-dimensional chromatography. The interface module may be used in various chromatographic systems to collect one or more chromatographic peaks, collect multiple fractions for a single chromatographic peak, collect one or more samples from a chemical reaction process or biological process (e.g., biopharmaceutical applications), and collect a sample from a sample preparation device.

The interface module includes a valve module and further includes a collection needle, a modifier module and a sample storage element, all of which are in fluidic communication with the valve module. The interface module may further include an interface module controller in communication with the modifier module and the valve module. The interface module controller is configured to change a valve state of the valve module and to control a position of the collection needle relative to the collection vials.

Advantageously, a two-dimensional chromatography system utilizing the interface module permits full automation of the process from the initiation of fraction collection for the first system through completion of the separation of a collected fraction injected as a sample into the second system. In contrast, conventional two-dimensional systems generally require manual intervention or robotic operations to transfer a tray of collected fractions from the first system to the sample manager of the second system.

FIG. 1 is a high-level block diagram shows a two-dimensional chromatography system 10 having an interface module 12 used for to collect one or more fractions from a first-dimension chromatography system 14 and provide the collected fractions as samples to a second-dimension chromatography system 16. Each sample injected into the second system 16 may include a modifier added to the fraction collected from the first system 14, although this is not a requirement. The first system 14 and second system 16 include a first chromatographic column and a second chromatographic column, respectively. Generally, the two columns differ in their chemistries, physical dimensions and column operating temperatures. In addition, each system may use one or more mobile phase solvents that differ from at least one mobile phase solvent in the other system. In some instances, the modifier added to the collected fractions from the first system 14 makes the collected fractions compatible with the column and solvents of the second system 16.

Figure 2:
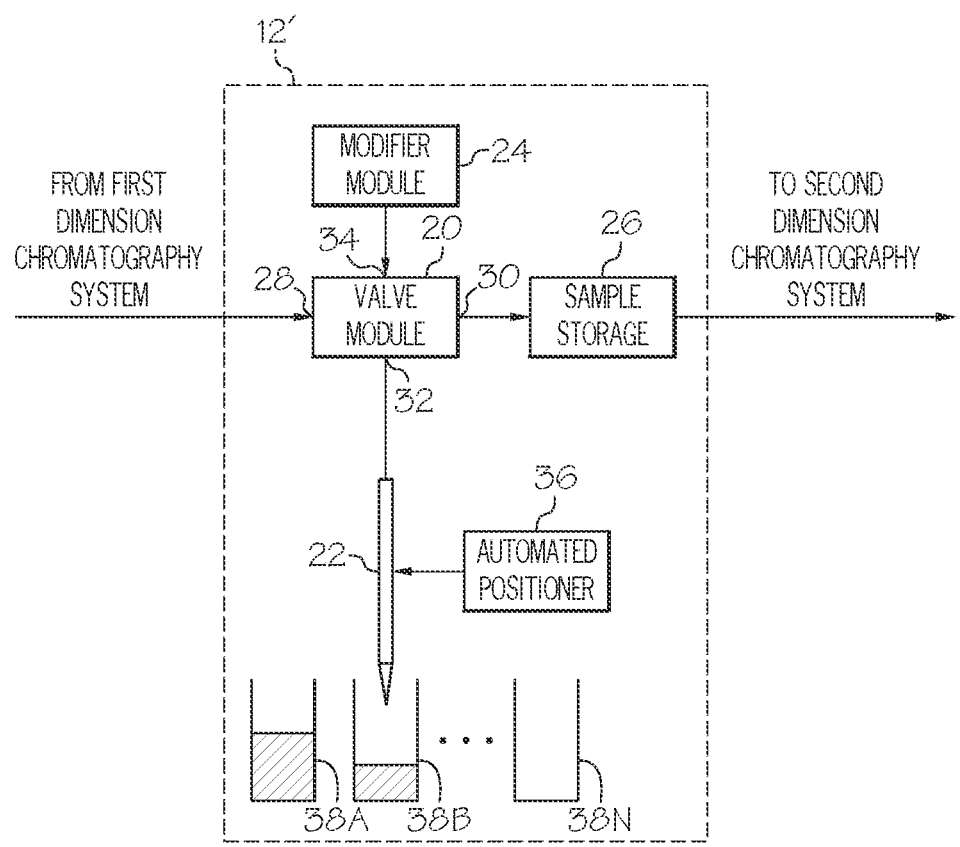
FIG. 2 is a block diagram of an example of the interface module of FIG. 1.

FIG. 2 is a block diagram of an example of the interface module 12 of FIG. 1. The interface module 12' includes a valve module 20, a collection needle 22, a modifier module 24 and a sample storage element 26. The valve module 20 has a first port 28 that receives an eluent from the first-dimension chromatography system 14, a second port 30 from which a collected fraction is provided as a sample for injection to the second chromatography system 16, a third port 32 and a fourth port 34. The collection needle 22 is in fluidic communication with the valve module 20 through the third port 32. The collection needle 22 is secured to a component of an automated positioner 36 which controls the position of the collection needle 22 with respect to a number N of collection vials 38A to 38N (generally 38) and other interface module components such as a wash station (not shown). The sample storage element 26 is in fluidic communication with the valve module 20 at the second port 30 and includes a device to store a fixed volume of a collected fraction for subsequent injection in the second chromatography system. In some examples, the sample storage element 26 is a sample loop such as a length of stainless steel tubing that may be coupled at each end to a port of a valve in the valve module 20. Although shown as part of the interface module 12', it should be recognized that the sample storage element 26 may be a component located in the second chromatography system 16. For example, the sample storage element 26 may be a sample loop coupled to an injection valve of the second system 16.

Not shown is an interface module controller that is in communication with the valve module 20, modifier module 24 and automated positioner 36. The controller is used to control and coordinate the operations of the valve module 20, modifier module 24 and automated positioner 36. The interface module controller may be a standalone control module that communicates with system processors and/or controllers used to operate the first and second chromatography systems 14 and 16. In other examples, the interface module controller is implemented in a processor used to operate one of the chromatography systems 14 and 16, or as part of a single processor used to control and coordinate operations of both systems 14 and 16.

During operation of the two-dimensional chromatography system 10, an eluent from a chromatographic separation performed with the first chromatography system is received by the valve module 20 and directed to a waste channel (not shown). When a fraction is to be collected, the valve module 20 redirects the received eluent out through port 32 and through a collection path, which includes the collection needle 22, into one of the collection vials 38. The determination that the fraction to be collected is present in the flow at the valve module 20 may be based on a signal from a detector disposed in the eluent flow path of the first system 14 downstream from the chromatography column and a time associated with the eluent flow rate and the flow path length between the detector and the valve module 20. After collection of the fraction is completed, the valve module 20 redirects the eluent to the waste channel until it is time for a next fraction to be collected. In the duration between consecutive fraction collections, the automated positioner 36 may optionally reposition the collection needle 22 to a waste channel so that the inside of the collection needle 22 may be cleaned by providing a flow of a wash solvent through the needle 22. Optionally, the outside of the collection needle 22 may be cleaned during this time, for example, by moving the needle 22 to a wash station although this step may be omitted if the collection needle 22 has not been used to extract a liquid from a vial 38 when the outside surface of the needle 22 would be in contact with the contents of the vial 38. Subsequent to the cleaning and before the next fraction is collected, the automated positioner 36 repositions the needle 22 to a different collection vial 38.

Unlike conventional two-dimensional chromatography systems, a system employing the interface module 12' is more flexible in that reconfiguration of hardware to switch between heart-cut mode operation and comprehensive mode implementation is not required. For heart-cut mode operation, consecutive "slices" of a fraction are collected in the collection vials 38 with rapid repositioning of the collection needle 22 and the omission of washing and redirection of the eluent of the first-dimension system 14 to waste. For comprehensive mode operation, consecutive fractions are collected into the vials 38 without reference to the presence of particular fractions in the eluent and without washing of the collection needle 22. However, a wash process that includes washing of the external surface of the collection needle 22 may be performed using a wash station during the time between the drawing of a collected fraction from one collection vial 38 and the subsequent drawing of a collected fraction from a different collection vial 38 to prevent cross-contamination, as described in more detail below.

In various examples of a method for performing a chromatographic separation using the interface module 12', the collected fractions may be modified, or "quenched," before being injection as modified samples into the second chromatography system 16. For example, the fractions collected from the first system 14 may not be chemically stable or compatible with the second system 16. To address these problems, a modifier solvent may be added to the collection vial 38 of one or more of the collected fractions. The modifier solvent may be used to cause a change in pH, a change in buffer ionic strength and/or a change in organic concentration. For example, the modifier solvent may be used to dilute the collected fraction prior to injection in the second system 16. Alternatively, the collected fractions may be quenched by addition of reagents and/or enzymes to prepare for sequential fraction modification/derivatization steps prior to injection into the second system 16.

Figure 3:
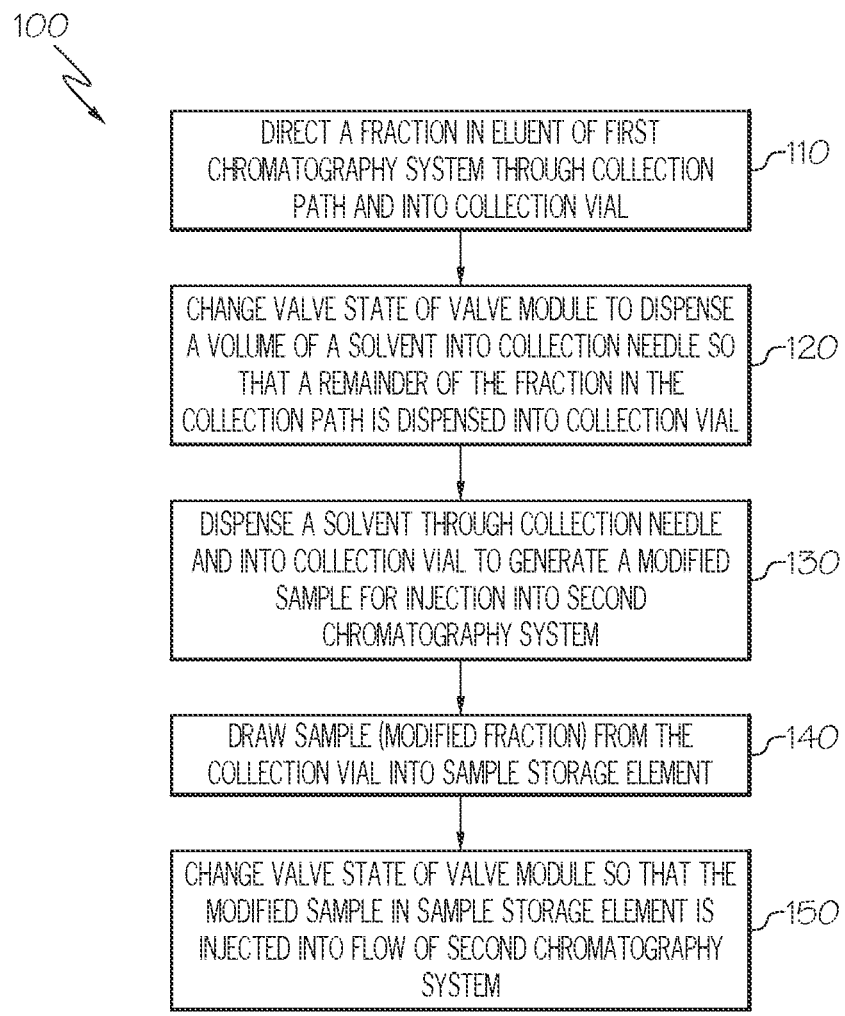
FIG. 3 is a flowchart representation of an example of a method for performing a chromatographic separation.

FIG. 3 is a flowchart representation of an example of a method 100 for performing a chromatographic separation. The method 100 is particularly suited for performing a two-dimensional chromatographic separation in an automated manner that allows for modification of one or more fractions collected from a first-dimension chromatography system into one or more modified samples for chromatographic separation on a second-dimension chromatography system. Reference is also made to FIGS. 4 to 8 which illustrate the configuration of an interface module 50 during different stages of the method 100. Primed reference numbers indicate an example of an element or component having the same (unprimed) reference number in a prior figure. Arrowheads are used on the flow paths to show the direction of active flows.

Figure 4:
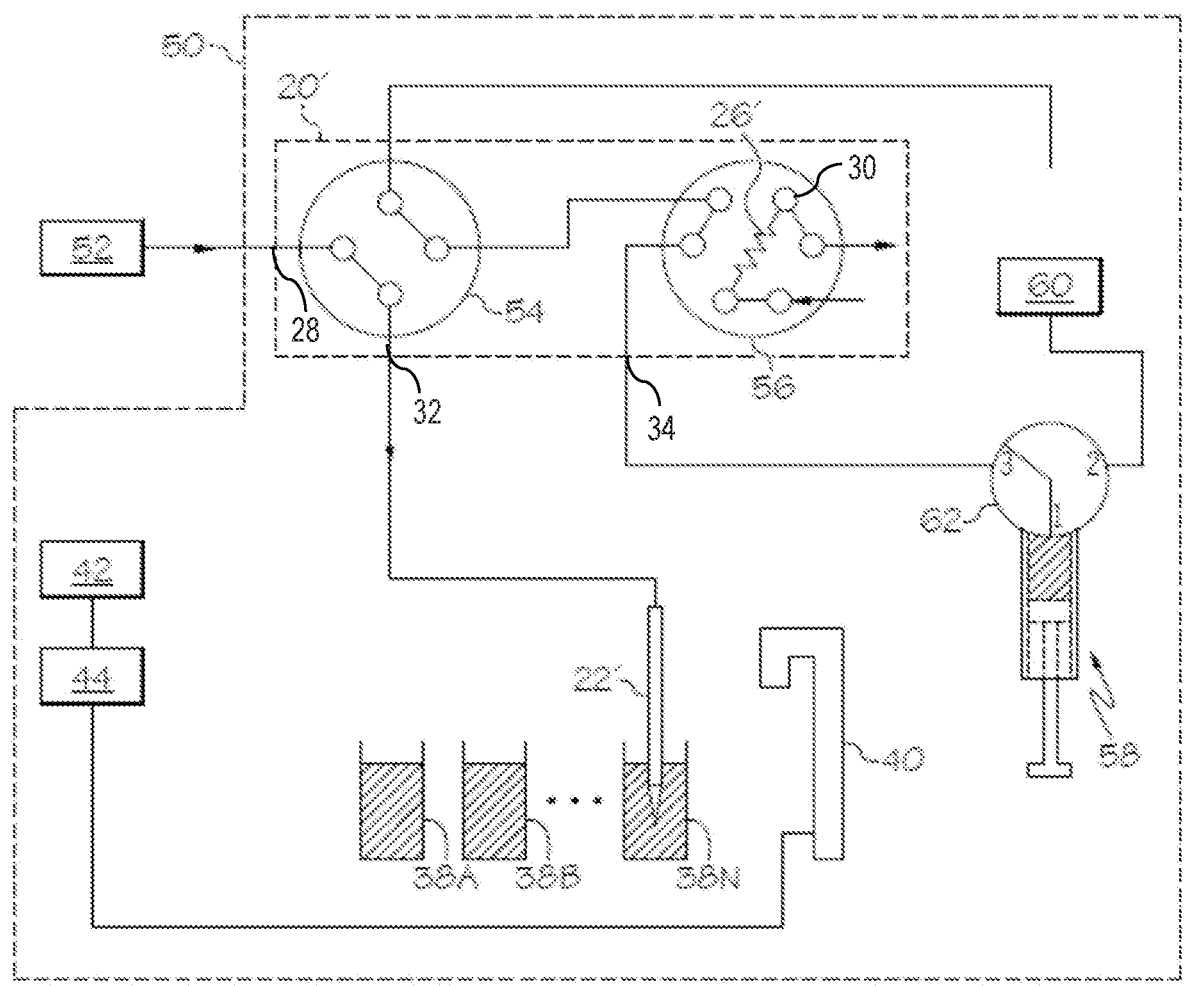
FIG. 4 shows an interface module that includes a valve module having a first valve and a second valve.

In FIG. 4, the interface module 50 includes a valve module 20' having a first valve 54 and a second valve 56. Each valve may be a rotary valve, such as a rotary shear seal valve in which a rotor is rotated with respect to a stator to change the cross-connection of flow paths coupled to the ports of the valve. The interface module 50 is configured to collect a fraction from the eluent flowing past a detector 52 in the first-dimension chromatography system to the first valve 54. A signal from the detector 52 indicating the presence of a fraction is used to determine the arrival of the fraction at the first valve 54 so that the first valve 54 is configured to a first valve state at the appropriate time to start fraction collection into a vial 38N. For example, the detector 54 may be a flow through cell in which detection is based on a change in an optical b passing through the flow.

One advantage of this configuration and operation relative to a conventional two-dimensional chromatography system utilizing sample loops for collecting the fractions is that the fractions collected in the vials 38 are not limited to a single volume as would be the case with a sample loop. Different volumes can be collected for different fractions. For example, a greater volume may be collected for a high volume chromatographic peak. Another advantage is that greater numbers of fractions can be collected. The number of fractions that may be collected by the interface module 50 may be based on the number of vials 38 included in the sample tray. For example, the number of vials may be 48, 96 or 384 according to established tray sizes.

Figure 5:
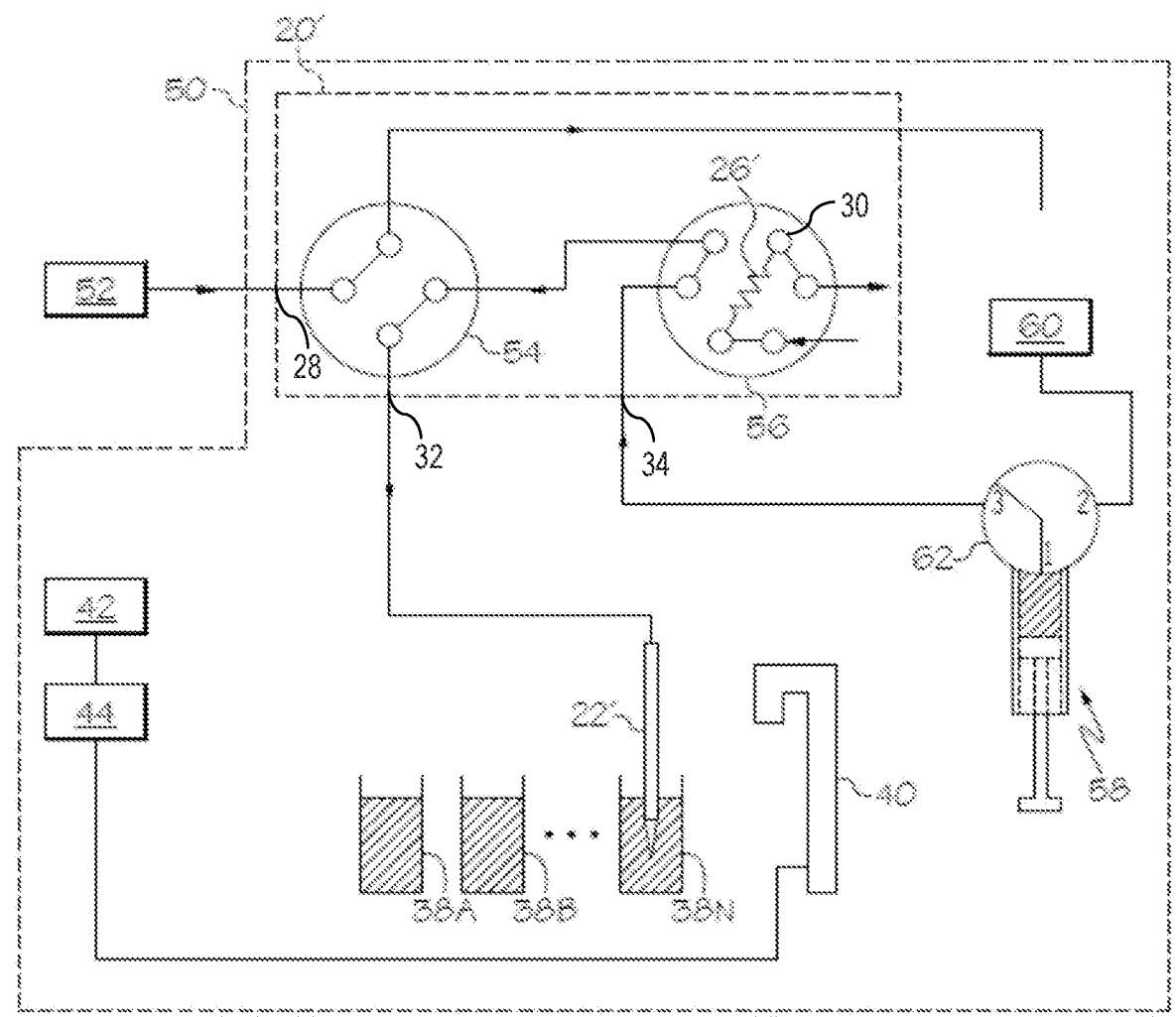
FIG. 5 shows the interface module of FIG. 4 with the valve module in a different configuration.

Once the fraction is directed (step 110) through the first valve 54 into a collection path that includes the collection needle 22', the first valve 54 is configured to a second valve state as shown in FIG. 5. In this configuration, the eluent is directed through the first valve 54 to a waste channel. A metering syringe 58 is activated to push an accurate volume of a first solvent through the second valve 56, the first valve 54 and into the collection needle 22'. The volume of solvent delivered by the syringe 58 is sufficient to dispense (step 120) any remaining portion of the fraction present in the collection path from the first valve 54 through the collection needle 22'. The solvent may be sourced from a solvent reservoir 60 in fluidic communication with the syringe 58 through a syringe valve 62.

Figure 6:
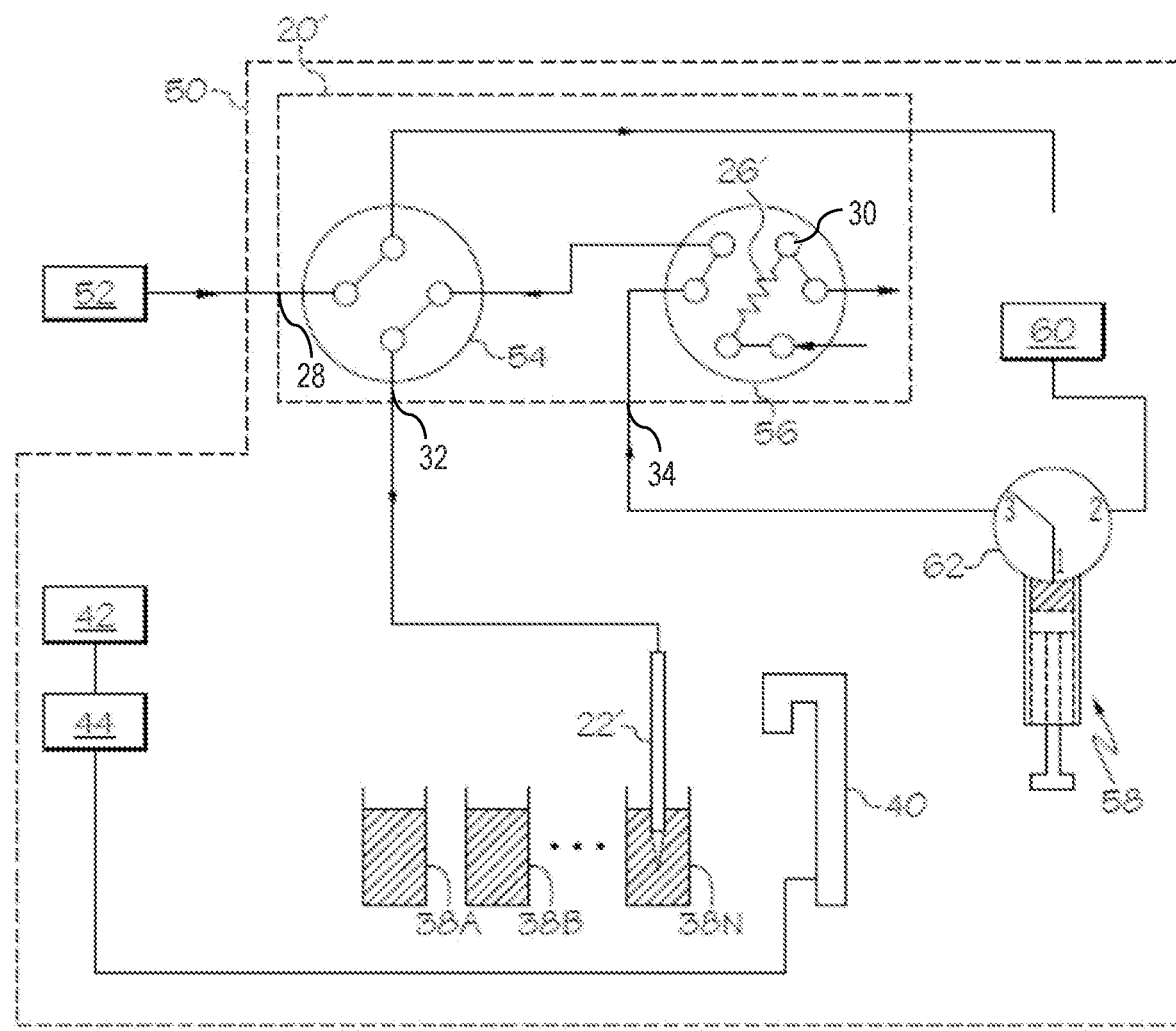
FIG. 6 shows the interface module of FIG. 4 during dilution of the contents of a collection vial.

The method 100 continues in step 130 so that additional solvent is pushed through the collection needle 22' into the collection vial 38N to modify the fraction, that is, to generate a modified sample, as shown in FIG. 6. The solvent may be the same solvent used to fully dispense the fraction from the collection needle. In this implementation, the solvent is used to dilute the contents of the collection vial 38N. The dilution can be used to alter the pH of the collected fraction to improve its stability over time. This can be beneficial if a large number of fractions are collected and there may be a significant delay before some of the fractions are injected as samples into the second-dimension chromatography system.

In some alternative implementations, a different solvent is dispensed through the collection needle 22' into the vial 38N to generate the modified sample. For example, a valve may be configured to fluidically couple the syringe 58 to multiple solvent reservoirs. In another example, a valve is configured to fluidically couple to one of multiple fluidic paths where each fluidic path includes a solvent reservoir and a dedicated metering syringe.

Figure 7:
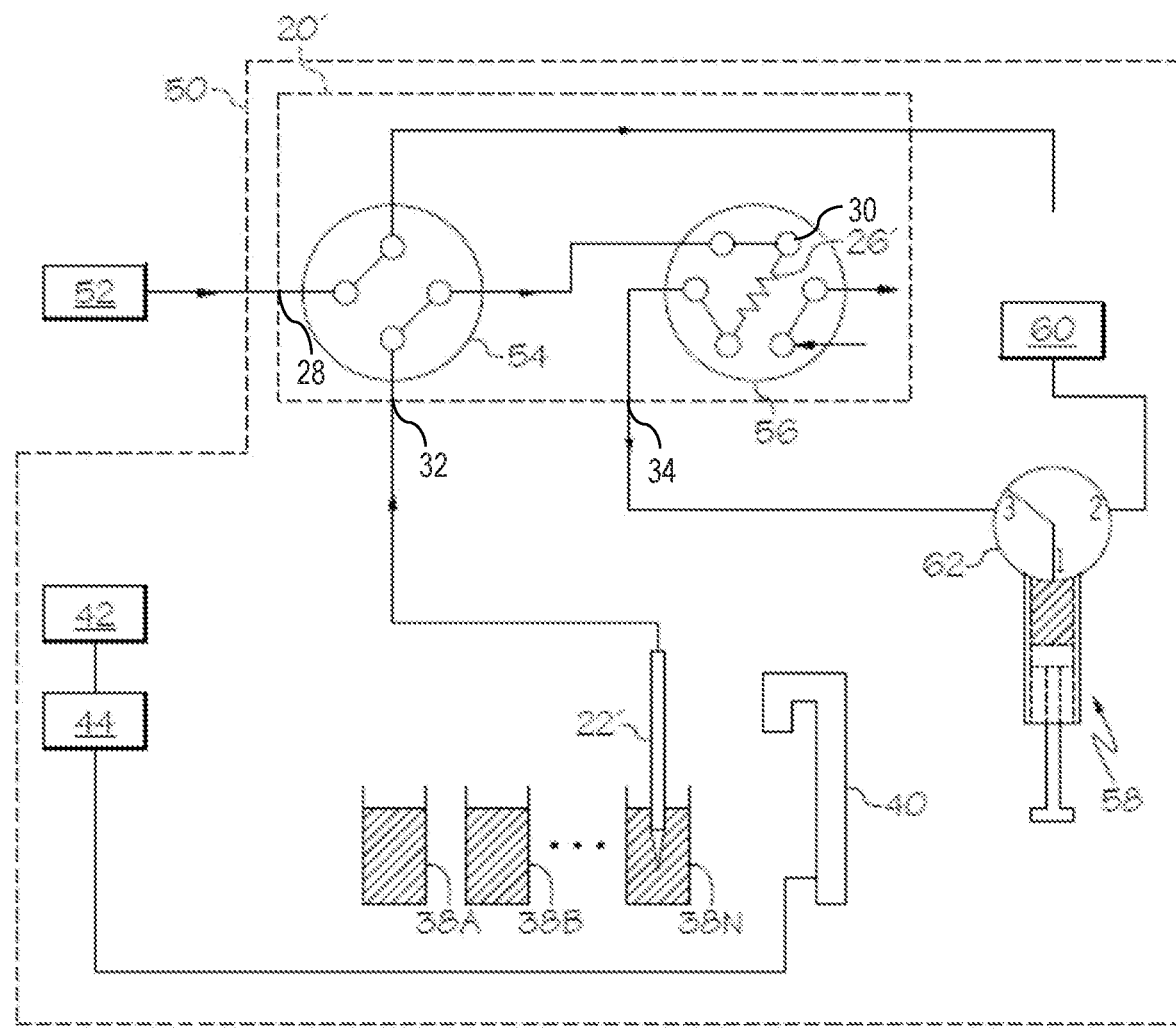
FIG. 7 shows the interface module of FIG. 4 configured for a load operation.

FIG. 7 shows the interface module 12' configured for a load operation. The metering syringe 58 is used to aspirate (step 140) at least a portion of the contents in the vial 38N through the first valve 54 and sample loop 26' to ensure that the full volume of the sample loop is occupied by the modified sample.

Figure 8:
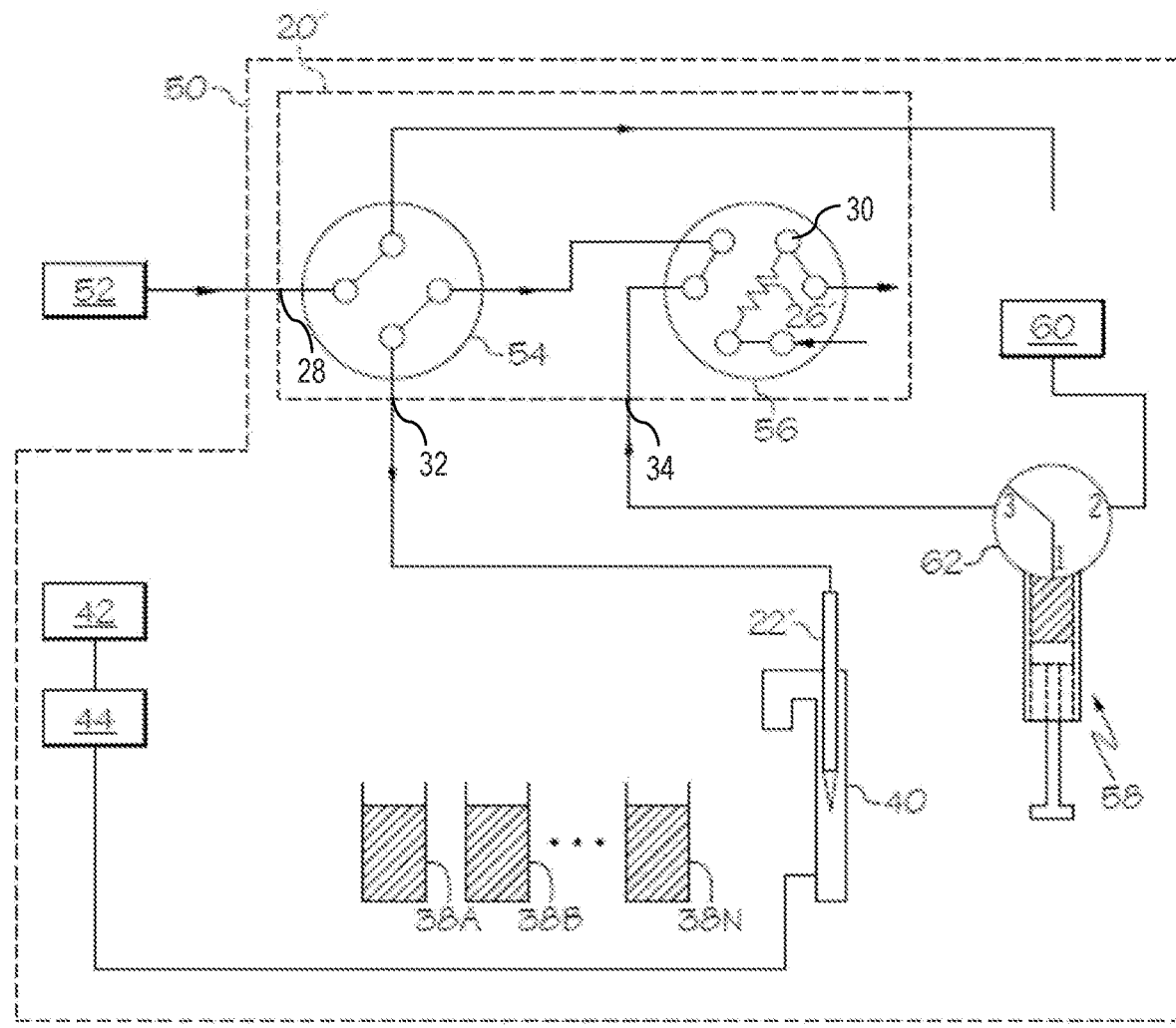
FIG. 8 shows the interface module of FIG. 4 configured for injection of a modified sample and washing of a collection needle.

Subsequently, the second valve is switched (step 150) for injection so that the sample loop 26' is introduced into the system flow path of the second chromatography system 16, as shown in FIG. 8. In conventional systems utilizing two or more sample loops to inject into the second-dimension, the variability in the volumes of the sample loop can be significant due to poor tolerance on the inner diameter of the sample loop tubing. Thus, another advantage of the interface module 50 is the improved precision of the volumes of the modified samples injected into the second-dimension system which leads to reduced variability in measurement results for similar samples.

In the illustrated configuration of FIG. 8, the collection needle 22' is shown located at a wash station 40. The wash station is used to wash the external needle surface with a solvent provided from a wash solvent reservoir 42 by a wash pump 44 while the inner needle surface is washed with solvent provided by the metering syringe 58. This cleaning process avoids carryover which otherwise can contaminate the next modified sample to be injected into the second chromatography system.

In one variation of the method 100, the dispensing of a volume of solvent into the collection to dispense the remainder of the fraction in the collection path and collection needle 22' is omitted. Instead, a timing-based switching based is used to ensure that none of the fraction remains in the collection path and needle 22'. For example, the signal from the detector 52 may be used to ensure enough of the system flow subsequent to the fraction passes into the collection needle 22' to ensure that the entire fraction is collected in the vial 38N.

In FIGS. 4 to 8, the valve module 20' includes two valves 54 and 56. It will be recognized that alternative implementations of the valve module 20' may include a single valve having a sufficient number of ports and internal valve channels. Such a valve may require a large rotor and stator interface. Thus, the single valve has to be constructed to withstand the system pressure requirements. In other alternative implementations of the valve module 20', the number of valves is three or more. In some of these instances, the valves in the valve module are directly coupled to multiple metering syringes and allow for selection from different solvents for modification of the collected fractions.

Figure 9:
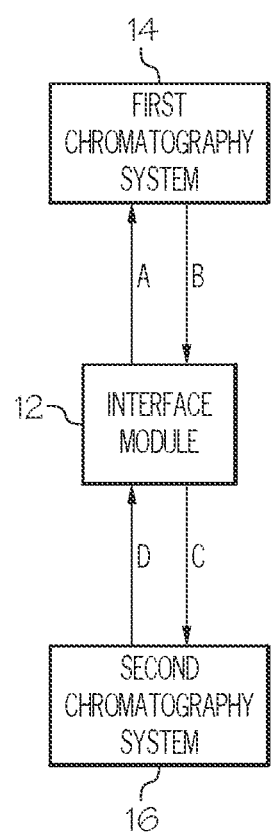
FIG. 9 is a block and sequence diagram showing how an interface module can performs additional roles as a sample manager for a first chromatography system and a fraction collector for a second chromatography system.

In examples provided above, the interface module is described to function, in part, as a fraction collector with respect to the first chromatography system and as a sample injector for the second chromatography system. However, the interface module may be utilized in an expanded role. Referring to the block and sequence diagram of FIG. 9, the interface module 12 performs the additional role of sample manager for the first chromatography system 14 and fraction collector for the second chromatography system 16. The sequence of steps is indicated by arrows and an alphabetic character A, B, C and D to indicate the order of steps in time. In this implementation, a sample to be separated by the first system 14 is obtained A from a sample vial accessible to the collection needle. The sample is extracted from the sample vial and loaded into a sample storage element to await injection into the first system 14. Fractions are acquired from the eluent of the first system 14 and stored B in collection vials in the interface module. The fractions are optionally modified before a fraction is injected C for sample separation in the second system 16. Optionally, fractions may be collected D from the eluent of the second system 16 into additional vials in the interface module 12.

It should be noted that the interface module 12 can also be operated in a manner such that the two chromatography systems 14 and 16 may be operated independently. That is, the first system 14 may simply operate to perform a chromatographic separation and optionally collect fractions. Similarly, the second system 16 may be operated independently to perform a separate chromatographic separation using samples independent of the collected fractions from the first system 14. Thus, the presence of the interface module 12 preserves an option to operate the two systems independently, either one at a time or concurrently.

While the invention has been shown and described with reference to specific embodiments, it should be understood by those skilled in the art that various changes in form and detail may be made therein without departing from the scope of the invention as recited in the accompanying claims.

What is claimed is:

1. A method of performing a chromatographic separation, the method comprising:
   providing an eluent of a first chromatography system through a valve module configurable in a plurality of valve states, the valve module being configured in a first valve state wherein the eluent is directed by the valve module into a collection path defined between the valve module and a collection vial to thereby dispense a fraction in the eluent into the collection vial;
   configuring the valve module in a second valve state to direct a volume of a first solvent into the collection path so that a remainder of the fraction in the collection path is dispensed into the collection vial;
   dispensing a second solvent through the collection path and into the collection vial to generate a modified sample;
   drawing at least a portion of the modified sample from the collection vial into a sample storage element; and
   configuring the valve module in a third valve state to direct a system flow of a second chromatography system through the sample storage element to thereby inject the modified sample into the second chromatography system.

2. The method of claim 1 wherein the second solvent is one of a buffer solvent, a solvent having a pH that is different from a pH of the first solvent, and a diluent.

3. The method of claim 1 wherein the first solvent and the second solvent are the same solvent.

4. The method of claim 1 wherein the sample storage element is a sample loop.

5. The method of claim 1 wherein dispensing the second solvent further comprises changing the valve state of the valve module.

6. The method of claim 1 wherein drawing at least a portion of the modified sample further comprises changing the valve state of the valve module.

7. The method of claim 1 further comprising:
   configuring the valve module to the first state after an injection of the modified sample into the second chromatography system; and
   repositioning the collection path to redirect the eluent of the first chromatography system through the collection path to dispense a different fraction in the eluent into a second collection vial.

* * * * *